Dec. 9, 1969  H. M. KEATING  3,482,861
COUPLING CHANNEL
Filed July 1, 1968
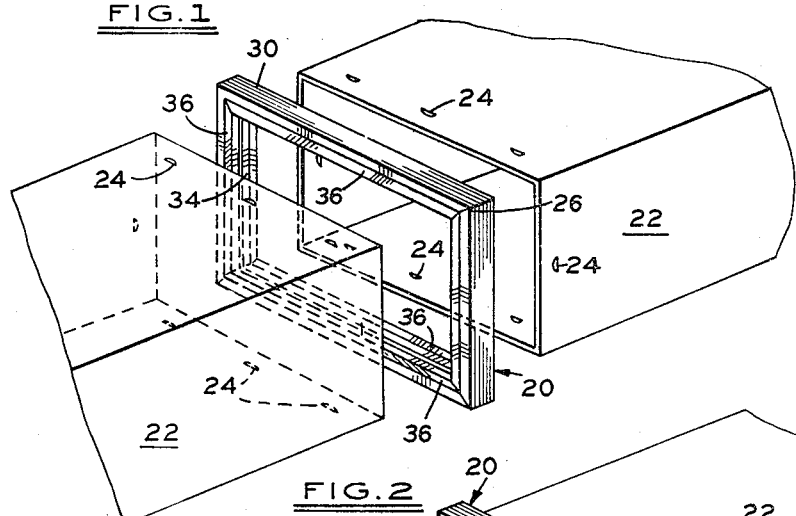
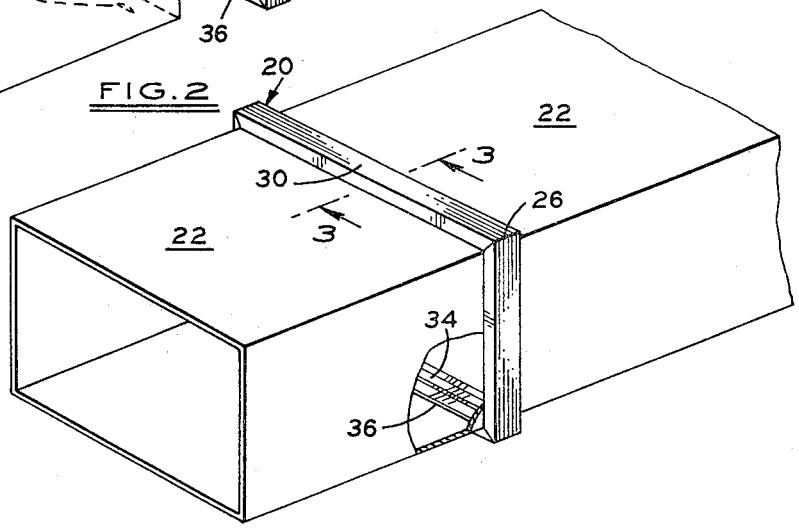
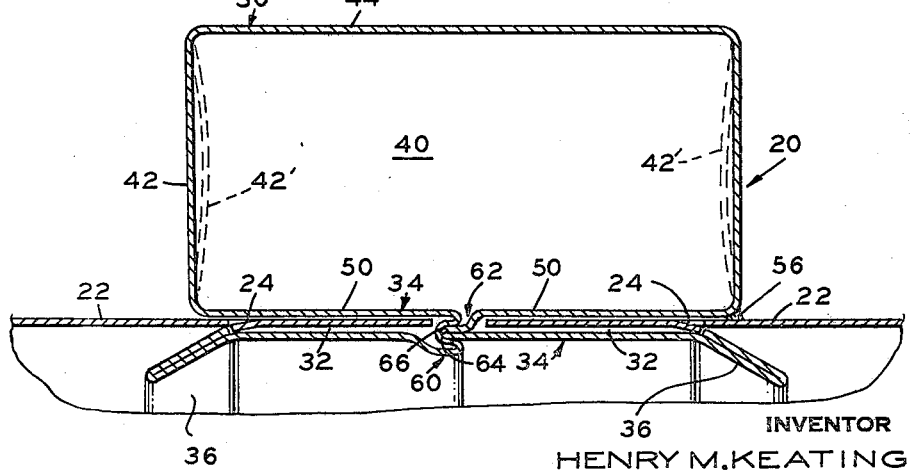
INVENTOR
HENRY M. KEATING
BY
Burton & Parker
ATTORNEYS

United States Patent Office 3,482,861
Patented Dec. 9, 1969

3,482,861
COUPLING CHANNEL
Henry M. Keating, 18945 Gilchrist,
Detroit, Mich. 48235
Continuation-in-part of application Ser. No. 470,374,
July 8, 1965. This application July 1, 1968, Ser.
No. 741,442
Int. Cl. F16l 21/06
U.S. Cl. 285—399     10 Claims

ABSTRACT OF THE DISCLOSURE

This disclosure relates to a coupling channel including an outer portion adapted to overlie the wall sections to be joined, whose lateral outer edges are reversely folded therebeneath to define opposed wall receiving channels. The opposed faces of the wall receiving channels provide interfitting abutting engagement to prevent relative displacement of the reversely folded legs during receipt of the wall sections. In the disclosed embodiment, the interfitting faces of the reversely folded legs are tensioned together during forming of the coupling channel to prevent displacement.

RELATED APPLICATION

This application is a continuation-in-part of my copending application for patent Ser. No. 470,374, filed July 8, 1965, now U.S. Patent No. 3,415,543.

DESCRIPTION OF THE PRIOR ART

The pertinent prior art is discussed more fully in my above reference co-pending application for patent. The following United States patents are however cited to illustrate coupling channels, of the type disclosed herein, wherein the reversely folded legs extend beneath the outer portion to abut or nearly abut: 394,479; 933,611, and 2,126,499.

It is however noted that these patents do not suggest interfitting or tensioned engagement, and the abutting engagement does not prevent relative displacement of the reversely folded legs during receipt of the duct or wall sections.

SUMMARY OF THE INVENTION

The coupling channel of this invention includes an outer portion adapted to overlie the wall sections to be joined and the opposed lateral edges of the outer portion are reversely folded therebeneath to define generally opposed wall-receiving channels. The opposed faces of the reversely folded legs provide interfitting abutting engagement to prevent relative displacement of the legs during receipt of the wall sections. In the preferred embodiment of the coupling channel, the opposed faces of the reversely folded legs provide a male and female interfitting joint, and the faces are tensioned together to prevent displacement or "riding-up" of one reversely folded leg over the other during receipt of the wall sections. In the disclosed embodiment, a wall of the outer portion of the coupling channel is spaced from the plane of the reversely folded legs to define a hollow outer channel which overlies the wall sections to be joined. This inner surface of the hollow channel is preferably smooth to permit telescopic receipt of a coupling member, such as the corner member disclosed in my co-pending application for patent, Ser. No. 625,390. In this embodiment, the hollow outer channel is generally rectangular in cross section, and the vertical walls are bowed slightly inwardly during the forming of the coupling channel, to tension the opposed faces of the reversely folded legs into interfitting engagement. A pressure of fifteen pounds per inch will prevent relative displacement, even in relatively long coupling systems.

BRIEF DESCRIPTION OF THE DRAWINGS

FIGURE 1 is a perspective view of a coupling frame adapted to join two duct sections, including four coupling channels of this invention;

FIGURE 2 is a perspective view of the coupling frame shown in FIGURE 1, with a portion cut away to show construction details; and FIGURE 3 is a cross sectional side elevation of the coupling frame shown in FIGURE 2, in the direction of view arrows 3—3, showing details of the coupling channel of this invention.

DESCRIPTION OF THE PREFERRED EMBODIMENT

FIGURES 1 and 2 illustrate the coupling channel of this invention, assembled in a coupling frame, to join rectangular duct sections. The duct sections 22 are provided with locking tabs 24 spaced about their periphery, near their adjoining ends. The frame 20 has been mitered at the corners 26, and may be welded if desired, or otherwise fused to provide a continuous rectangular cross section outer frame 30, and continuous duct receiving channels 32. The duct sections of this embodiment will maintain a static pressure of at least eight inches without leakage, and therefore is suitable for high pressure duct systems. High pressure, in duct systems, is about five and one-half inches of static pressure.

The coupling channel of this invention may also be utilized with corner members, as shown in my co-pending application for patent Ser. No. 625,390, rather than the mitered corners shown. The utilization of the coupling channel and frame shown in my above referenced co-pending applications for patent has already provided advantages not found in previous coupling members. For example, conventional high pressure duct joints generally require a flange or lip of approximately one inch on the ends of the duct section, which are bolted to the flange of the adjoining ducts, or a frame means. A seal such as a strip of neoprene or asbestos is provided between the flanges. This joint is difficult to secure, especially in large duct systems where the access is very limited, and the flanges must be accurately aligned to insure a properly sealed joint. Another problem with the conventional high pressure duct joint is the "pile up" of large variations caused by forming the flanges or lips on the ends of the ducts. Further, because the flanges are formed from the ducts, the corner of the duct must be open, which may allow leakage at high pressures. These problems have been eliminated by the improved coupling channel and frame of my invention, which does not require a flange or lip on the end of the duct sections. The spacing between the ducts is approximately one quarter of an inch, which may be accurately controlled to prevent pile up of length variations. The coupling channel and frame shown by my co-pending applications for patent do however have one disadvantage which has been solved by the coupling channel of this invention. The opposed ends of the reversely folded legs may tend to ride-up, as the wall sections are received in the opposed wall receiving channels; thus making more difficult the assembly of the coupling channel or frame.

FIGURE 3 illustrates how these advantages of this invention are carried out. The hollow cross section upper frame 30 overlies the adjoining duct sections 22, which in this embodiment are received in continuous channels 32. The channels are defined by reversely folded legs 34, integral with the upper frame 30. The distal ends of the legs 34 have angularly related laterally extending locking lips 36, which engage and retain the locking lips 24 struck from the ducts 22.

The outer portion or frame 30 defines a chamber 40, which communicates with the interior of the ducts 22. In the preferred embodiment of the rectangular outer frame, the generally vertical height of the upper frame, defined by the vertical walls 42, is at least one-half of the generally axial length of the frame, defined by the walls 44. This provides flexibility in the coupling channel, and permits joining of duct or wall sections which are not accurately aligned. Where the coupling channel is utilized as shown to join duct sections, the chamber 40 serves as an insulator, and may be filled with a deformable insulating material, such as plastic foam, in high temperature systems.

In the preferred embodiment of this invention, the opposed ends 60 and 62 of the reversely folded legs are disposed in interfitting abutting engagement, to prevent relative displacement of the reversely folded legs during receipt of the wall or duct sections 22. In this embodiment, the opposed ends provide a "tongue-in-groove" joint, wherein one edge 60 provides the female portion 66, and the opposed edge 62 provides the male portion 64. The opposed edges are tensioned together, in this embodiment, by bowing the vertical walls 42 of the rectangular outer frame 30 during forming of the coupling channel, as shown in phantom at 42$^1$. When the channel is completed, the tensioned engagement of the opposed ends 60 and 62 bows the vertical walls outwardly to the nearly vertical position shown at 42. A pressure of approximately fifteen pounds per inch between the opposed edges of the reversely folded legs has been found suitable to prevent disengagement or relative displacement of the reversely folded legs during receipt of the wall or duct sections.

It should be noted that the inner surface 50 of the reversely folded legs is relatively smooth in this embodiment to permit telescopic receipt of a coupling member, such as the corner member shown in my co-pending application for patent Ser. No. 625,390. The necessary vertical displacement of the opposed ends 60 and 62, during rolling of the coupling channel, is disposed inwardly toward the axis of the frame, so as not to interfere with the receipt of the coupling member. Further, the curvature of the male and female portions 64 and 66 of the opposed ends of the reversely folded legs is relatively smooth, which permits pivotal engagement between the ends of the joint. This allows displacement of the opposed wall receiving channels during receipt of the wall sections, and permits receipt of misaligned wall sections.

It will be understood by those skilled in the art, that various modifications may be made to the disclosed embodiment of this invention without departing from the purview of the appended claims. For example, the mitered corners 26 may be replaced by corner members, or the like, as shown in my co-pending application for patent. Further, the outer portion 30 may take other forms than the rectangular form disclosed. For example, the outer frame may be triangular or rounded, or the outer frame may be substantially eliminated by making the outer portion relatively flat. Further, other means may be utilized to secure the duct or wall sections 22 within the opposed channels, such as rivets or the like. The coupling channel of this invention may also be utilized to secure wall or ceiling sections in building applications, or may be utilized to secure various structural elements.

What is claimed is:

1. A coupling channel for receiving and joining wall sections, comprising: an outer channel section adapted to overlie the wall sections to be joined, the opposed lateral edges of said channel section shaped to provide a pair of legs reversely folded beneath the open side of said channel section to define generally opposed wall-receiving channels with the legs having opposed edges, said opposed edges of said reversely folded legs disposed in abutting engagement and interfitting to prevent relative lateral displacement of the legs during receipt of the wall sections in the wall receiving channels.

2. The coupling channel defined in claim 1, characterized in that one of said opposed edges of said reversely folded legs provides a female joint portion and the other opposed edge provides a male joint portion interfitting with said female portion to prevent said relative displacement.

3. The coupling channel defined in claim 2, characterized in that said outer channel section of said coupling channel is hollow to permit telescopic receipt of a coupling member in an end thereof.

4. The coupling channel defined in claim 3, characterized in that said outer channel section is substantially rectangular in cross section.

5. The coupling channel defined in claim 4, characterized in that said outer channel section has vertical walls which are bowed slightly inwardly to tension said opposed edges of the reversely folded legs into said abutting interfitting engagement.

6. The coupling channel defined in claim 1, characterized in that said outer channel section is shaped to provide means tensioning together said opposed edges of the reversely folded legs into interfitting abutting engagement to inhibit displacement of the reversely folded legs during receipt of the wall sections.

7. The coupling channel defined in claim 6, characterized in that said opposed edges are tensioned into interfitting abutting engagement by at least fifteen pounds per inch pressure.

8. The coupling channel defined in claim 6, characterized in that said opposed interfitting edges of the reversely folded legs include an integral tongue-in-groove joint.

9. The coupling channel defined in claim 8, characterized in that said tongue-in-groove joint is rounded at the interfitting faces to permit pivotal displacement of the opposed wall receiving channels during receipt of the wall sections.

10. The coupling frame defined in claim 8, characterized in that said outer channel section is hollow to permit telescopic receipt of a coupling member in the end thereof.

References Cited

UNITED STATES PATENTS

| | | | |
|---|---|---|---|
| 394,479 | 12/1888 | Evans et al. | 285—183 |
| 2,126,499 | 8/1938 | Petersen | 52—468 X |
| 2,242,468 | 5/1941 | Holub | 285—183 |
| 2,330,769 | 9/1943 | Wichner | 285—424 X |
| 2,358,733 | 9/1944 | Overly | 52—461 |
| 2,491,700 | 12/1949 | Zwerling | 285—406 X |
| 2,531,349 | 11/1950 | Brett | 285—417 X |
| 3,242,948 | 3/1966 | Dunn | 138—166 |
| 3,403,220 | 9/1968 | Riedel et al. | 138—162 X |

FOREIGN PATENTS 967,745  8/1964  Great Britain.

DAVID J. WILLIAMOWSKY, Primary Examiner

WAYNE L. SHEDD, Assistant Examiner

U.S. Cl. X.R.

52—726, 731; 138—166; 285—417, 424; 287—189.36